(12) United States Patent
Shirai et al.

(10) Patent No.: US 8,316,436 B2
(45) Date of Patent: Nov. 20, 2012

(54) USER-DEFINED MULTIPLE INPUT MODE AUTHENTICATION

(75) Inventors: Kazuhiko Shirai, San Diego, CA (US); Yasuhiro Habara, San Diego, CA (US); Koki Iwazaki, San Marcos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 534 days.

(21) Appl. No.: 12/413,030

(22) Filed: Mar. 27, 2009

(65) Prior Publication Data

US 2010/0251359 A1    Sep. 30, 2010

(51) Int. Cl.
| | |
|---|---|
| G06F 7/04 | (2006.01) |
| G06F 12/00 | (2006.01) |
| G06F 12/14 | (2006.01) |
| G06F 13/00 | (2006.01) |
| G06F 17/30 | (2006.01) |
| G11C 7/00 | (2006.01) |
| H04N 7/16 | (2006.01) |

(52) U.S. Cl. .......................................... 726/19; 726/28
(58) Field of Classification Search .................. 726/2–8, 726/16–19, 26–28; 382/115–127; 340/5.8, 340/5.81–5.85, 5.51–5.54
See application file for complete search history.

(56) References Cited

U.S. PATENT DOCUMENTS

| | | | |
|---|---|---|---|
| 6,389,542 B1 | 5/2002 | Flyntz | |
| 2002/0184538 A1* | 12/2002 | Sugimura et al. | 713/202 |
| 2004/0228507 A1* | 11/2004 | Es | 382/124 |
| 2008/0001703 A1* | 1/2008 | Goto | 340/5.8 |
| 2008/0098460 A1* | 4/2008 | Jain | 726/4 |
| 2008/0126260 A1* | 5/2008 | Cox et al. | 705/67 |
| 2008/0252414 A1 | 10/2008 | Crigger et al. | |
| 2009/0193514 A1* | 7/2009 | Adams et al. | 726/17 |
| 2010/0169659 A1* | 7/2010 | Shnowske et al. | 713/183 |
| 2010/0199323 A1* | 8/2010 | Salyards et al. | 726/1 |

* cited by examiner

*Primary Examiner* — Philip Chea
*Assistant Examiner* — Trong Nguyen
(74) *Attorney, Agent, or Firm* — John L. Rogitz

(57) ABSTRACT

A user can define two or more input modes with respective input values to establish an authentication protocol to unlock a computer or govern other computer behavior. As an example, the user may first establish a particular voice recognition pattern followed by a particular image recognition and subsequent logons can be accomplished only by speaking the voice recognition pattern into the device and then by presenting the commanded image, such as an image of the user's face, to the device.

14 Claims, 2 Drawing Sheets example user interface sequence overall logic example user
interface sequence example application
user interface

USER-DEFINED MULTIPLE INPUT MODE AUTHENTICATION

FIELD OF THE INVENTION

The present invention relates generally to user-defined multiple input mode authentication and command and control. More particularly, present principles relate to simple easy-to-use human interactions with computing devices via a combination of input operations that can be used for device security lock/unlock controls, and/or basic operations.

BACKGROUND OF THE INVENTION

User input sequences such as passwords are used to unlock computing device behaviors and controls. Examples include unlocking the computing device for operation. Typically, only one input mode is used, e.g., only a text entry or only a biometric input is used to unlock a computer.

As understood herein, such approaches tend to be complex and inflexible while paradoxically not always providing adequate security and reliability. For example, in the case of passwords, users must either use a simple password for ease of remembering it or a complex password that increases security but is harder to recall, and users typically have no other options for a given device. Fingerprint readers (FPR) have been used as authentication devices but suffer from reliability and spoofing drawbacks.

SUMMARY OF THE INVENTION

A user is allowed to configure combinations or sequences of input operations, including keyboard entry sequences, touch panel operations, biometric sensor inputs, voice/image/video recognitions, to define the device behaviors/controls. The device behaviors/controls can include functionalities such as device security lock/unlock authentications, and context sensitive complex application activations such as establishing network connections.

Accordingly, a computer includes a processor and a computer readable storage medium accessible to the processor and bearing instructions embodying logic. The logic includes permitting a user to select a first input mode with associated first input parameter, and permitting a user to select a second input mode with associated second input parameter. The first input mode is different from the second input mode. A behavior of the computer is executed only when subsequent inputs of the first and second parameters are received in the first and second input modes in an order specified by the user.

The user can be allowed to select the behavior. Without limitation, the behavior can be unlocking the computer for full use thereof, or establishing a network connection. The input modes may be selected from text keyboard sequence, touch screen input, biometric sensor input, voice input, image recognition, accelerometer input, position sensor input.

By combining simple input events (e.g., simple audio input recognitions with simple parametric analysis, such as cadences, timings) followed by more complex processor-intensive processed input information (e.g., image/video recognitions), the device does not have to keep activating processing and power consumption intensive input methods standing by to wait for the user input, and therefore prolongs battery life.

In another aspect, a method includes presenting, on a computer display, a sequence of user interfaces to permit a user to define two or more input modes with respective input values to establish an authentication protocol to enable a computer behavior. The computer behavior is executed only when the input values are received.

In another aspect, a computing device has a processor, a display coupled to the processor, and first and second input devices coupled to the processor that are of different genre from each other. The processor receives a first input mode value from the first input device and a second input mode value from the second input device. The processor then determines whether the first and second values match user-defined values, and only if a match is found, executes a computer behavior.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
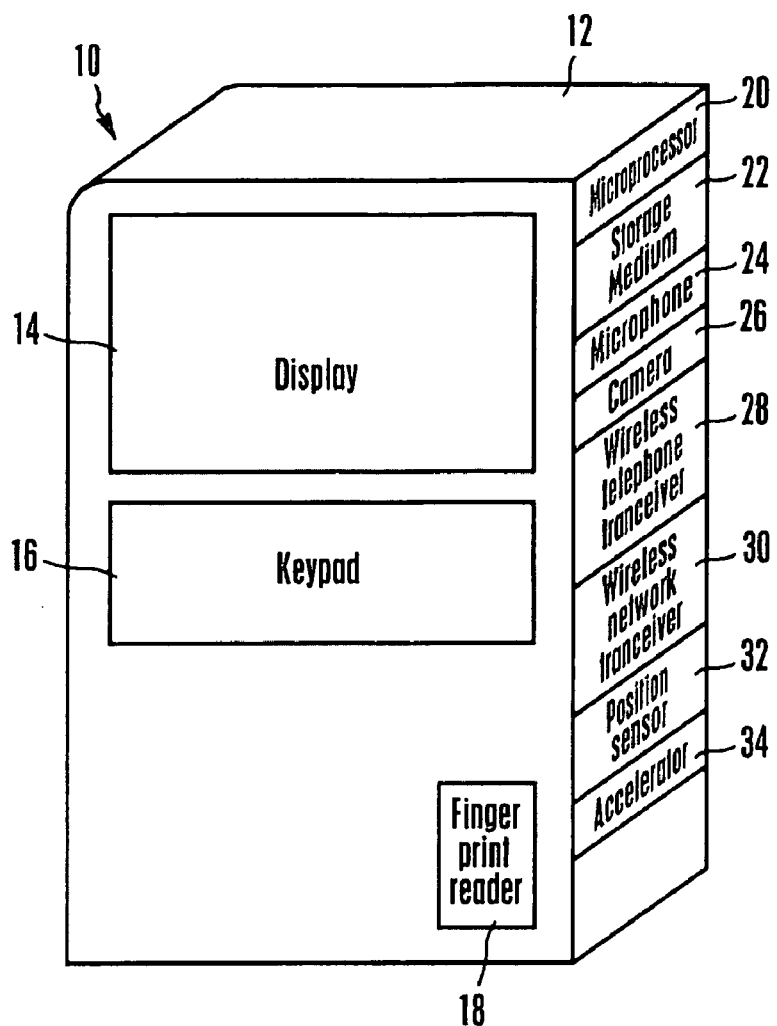
FIG. 1 is a schematic perspective view of a computing device which can employ present principles.

Referring initially to FIG. 1, a computer 10 that in the embodiment shown includes a portable lightweight housing 12 has a display 14 such as a touch screen display and a key input device 16 such as a keypad. The computer 10 may be implemented in one example embodiment by a smart phone. In some embodiments a fingerprint reader (FPR) 18 may also be provided on the housing 12.

The key input device 16 and FPR 18 typically provide input signals to one or more processors 20 (only one processor shown) in the housing 12. The processor 20 controls the display 14 to present a demanded image and, when the display 14 is a touch screen display, the processor 20 receives input from the display 14.

The processor 20 can access one or more tangible computer readable storage media 22 to read and write data thereto and to execute logic stored thereon. The medium 22 shown in FIG. 1 may be implemented by disk storage, solid state storage, etc.

FIG. 1 shows various additional sources of input signals to the processor 20 that may be supported on the housing 12. For example, a microphone 24 may provide voice input to the processor 20, while a camera 26 may provide still and/or moving image input to the processor 20.

When the computer 10 is implemented as a smart phone a wireless telephony transceiver 28 may be supported on the housing 12 for enabling voice and/or data calls to be made using the computer 10. The telephony transceiver 28 may be, without limitation, a global system for mobile communication (GSM) transceiver or code division multiple access (CDMA) transceiver or orthogonal frequency division multiplexing (OFDM) transceiver or satellite phone transceiver or variants thereof.

If desired, a wireless network transceiver 30 may also be provided on the housing 12 to permit network communication using the computer 10. The transceiver 30 may be, without limitation, a Bluetooth transceiver, Wi-Fi transceiver, or other appropriate transceiver.

FIG. 1 also shows that the processor 20 may receive input from a position sensor 32, such as but not limited to a global position satellite (GPS) receiver or magnetic compass sensor, that indicates the geographic position of the computer 10. Also, the processor 20 can receive input from an accelerometer 34 that indicates the acceleration, if any, of the computer 10.

Figure 2:
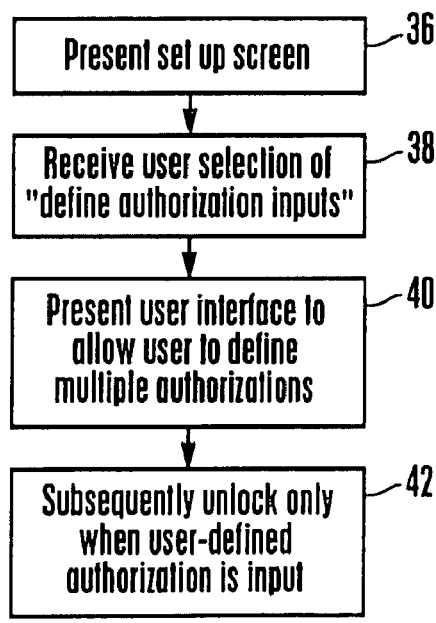
FIG. 2 is a flow chart of example overall logic.

FIG. 2 shows example logic that may be implemented by the processor 20. A set-up screen may be presented on the display 14 at block 36 to enable a user to select to define what specific input modes and values associated therewith are to be used for purposes discussed below. The user's selection to define the modes and values are received at block 38. At block 40, the processor 20 causes the display 14 to present a user interface, an example of which is discussed below, on the display 14 to allow the user to define a multi-mode with corresponding multi-value protocol for enabling a user-selected computer behavior. This behavior is unlocked at block 42 subsequently, and only when the user-defined protocol is input as specified by the user, i.e., only when input modal values match the user-defined values, such that only if a match is found, the computer behavior is unlocked.

Figure 3:
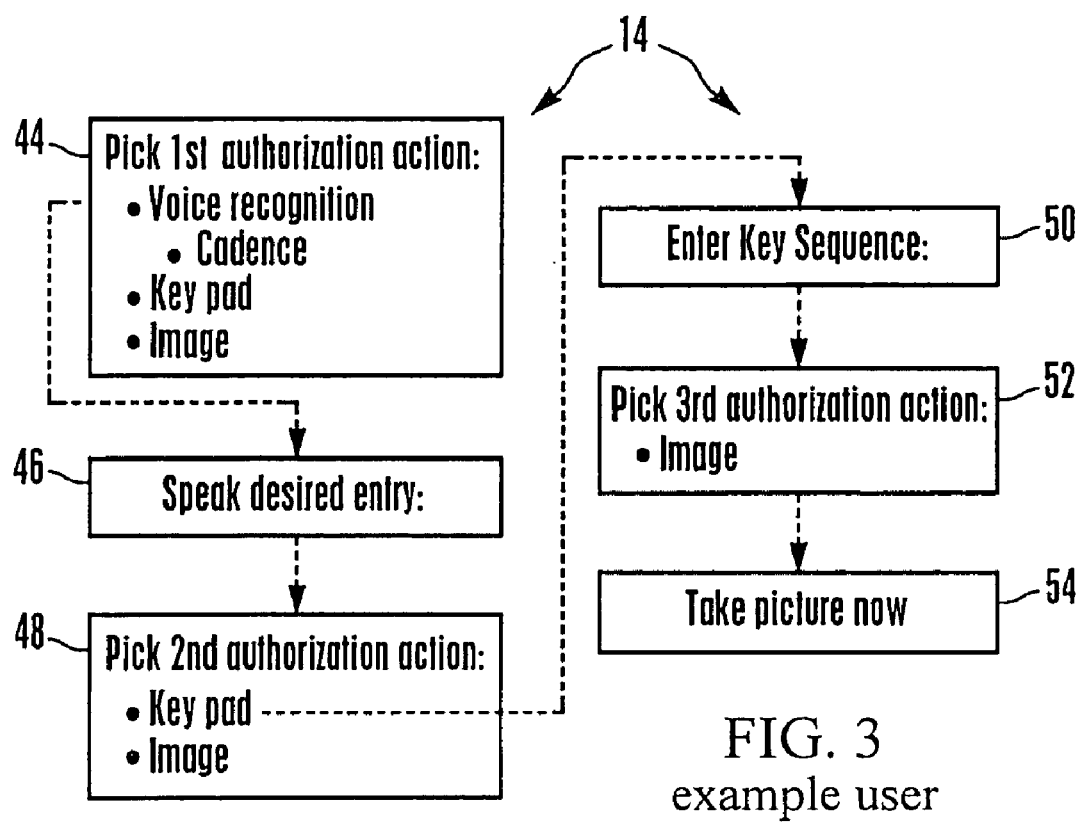
FIG. 3 shows a sequence of screen shots illustrating example user interfaces that may be presented on the computing device to allow a user to define a multi-modal input sequence.

FIG. 3 gives an example set of user interface screens that may be presented on the display 14 in the logic of block 40 of FIG. 2. The screen 44 instructs the user to select a first mode. In the example shown, the first mode may be selected from a list that includes voice recognition, potentially with a corresponding cadence, keypad entry, and image entry.

Assuming the user selects voice recognition, the screen 46 may be presented, in which the user is instructed to speak into the microphone 24 the desired value or parameter of the voice mode component, e.g., a word or word string. The parameters may include specific words and/or cadence, timing, and/or more advanced voice recognition parameters such as voice prints, voice-to-text recognition, etc.)

The processor 20 can execute voice recognition software to convert the signal from the microphone to data values that are stored on the medium 22. The values are associated with "voice mode", i.e., with a requirement that the values be received subsequently from the microphone 24.

Because multiple modes are to be defined the screen 48 may next be presented on the display 14, instructing the user to select a second mode. Note that the mode selected as the first mode (voice input) does not appear on the screen 48, but only the remaining available modes. Assuming the user selects "keypad" the screen 50 may appear, instructing the user to input the desired key sequence as corresponding values for the keypad mode. The values are stored on the medium 22 and correlated to the keypad 16.

If desired, the user may be given the opportunity to select more than two modes, and if so the screen 52 may be presented in which the user is instructed to select a third mode, with the first two modes selected not appearing on the screen 52. Assuming the user selects "image" the screen 54 can be presented instructing the user to take a picture of the desired image, e.g., the user's face, which is stored in memory and associated with the camera 26. The image can include still images (pattern, optical character recognition, etc.), video image recognition (which may include movement detection, color pattern analysis, etc.)

Additional input modes and data values may be defined by the user in accordance with above principles. For instance, the user may be given the opportunity to select a geographic position and a radius around the position beyond which the necessary match discussed below will not be made. Also, the user may be given the opportunity to define a particular acceleration of the computer as an input mode by, e.g., moving the computer in an intended fashion and having the corresponding signal from the accelerometer 34 stored as the data value for that input mode. Touch screen 14 entry of finger position and/or movement may establish yet another mode, and entry from the FPR 18 or other biometric sensor may establish another mode.

Figure 4:
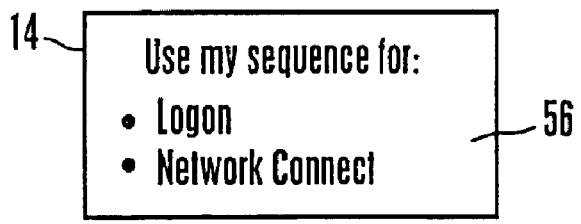
FIG. 4 is an example screen shot of a user interface allowing the user to define which computer behavior is governed by the multi-modal input sequence.

Once the mode sequence and values have been defined by the user, FIG. 4 shows that a screen 56 may be presented to enable the user to define the purpose for which subsequent input of the defined mode sequence and values is to be used. For example, the user may elect to require input of the defined protocol to logon to the computer, or to connect to a network. Other computer behaviors that can be invoked only upon input of the user-defined multi-modal protocol include a transition from a device state with the low power consumption hibernation mode with security device lock engaged to another state with active use of the application software or the network service access functions.

As an example of input sequences that can be used to unlock user-defined computer behaviors, a simple voice (audio) signal from the microphone 24 may first be required and if the input signal matches the user-defined value from block 40 in FIG. 2, the second mode is triggered. If the second mode is image detection, the camera 26 is then activated and input from the camera is tested against the user-defined image value stored at block 40 in FIG. 2. This may be done by activating an embedded camera. The user-defined behavior that is associated with the multi-modal protocol is enabled only when the input mode values match the user-defined values that were established at block 40.

By combining/sequencing multiple types of input human interactions including advanced processing results such as pattern recognitions for voice/image/video inputs, present principles improve the following aspects of the human input operation customization/personalization functions; a) intuitive and easy-to-operate inputs, b) flexibility to define relatively complex device behaviors, c) security and reliability for unambiguous human input events especially in non-text forms.

In addition, by combining simple input events (e.g., simple audio input recognitions with simple parametric analysis, such as cadences, timings) and complex processor-intensive processed input information (e.g., image/video recognitions), the computer 10 does not have to keep activating processing- and power-intensive input methods standing by to wait for the user input, and therefore prolongs battery life.

While the particular USER-DEFINED MULTIPLE INPUT MODE AUTHENTICATION is herein shown and described in detail, it is to be understood that the subject matter which is encompassed by the present invention is limited only by the claims.

What is claimed is:

1. Computer for authenticating a user comprising:
   processor;
   computer readable storage medium accessible to the processor and bearing instructions embodying logic comprising:
      permitting a user to select a first input mode with associated first input parameter;
      permitting the user to select a second input mode with associated second input parameter, the first input mode being different from the second input mode; and executing a behavior of the computer only responsive to a determination that subsequent inputs of the first and second parameters are received in the first and second input modes in a sequential order of input modes specified by the user, wherein the first input mode is selected from the group of input modes consisting of touch screen input, or accelerometer input, or position sensor input and the second input mode is selected from the group of input modes consisting of text keyboard sequence, touch screen input, biometric sensor input, voice input, image recognition, accelerometer input, position sensor input, and wherein the user specifies the modes and sequential order using a user interface.

2. The computer of claim 1, wherein the logic further comprises allowing a user to select the behavior.

3. The computer of claim 1, wherein the behavior is unlocking the computer for full use thereof.

4. The computer of claim 1, wherein the behavior is establishing a network connection.

5. The computer of claim 1, wherein the logic further comprises:

permitting a user to select a third input mode with associated third input parameter; and executing the behavior of the computer only when subsequent inputs of the first, second, and third parameters are received in the first, second, and third input modes.

6. Method for authenticating a user comprising:

presenting, on a computer display, a sequence of user interfaces to permit a user to define two or more input modes with respective input values to establish an authentication protocol to enable a computer behavior, the user also being permitted to establish a sequential order in which input values are to be input; and executing the computer behavior only responsive to a determination that the input values are received in the order in which input values are to be input as established by the user, wherein a first input mode is selected from the group of input modes consisting of accelerometer input, or position sensor input and a second input mode is selected from the group of input modes consisting of text keyboard sequence, touch screen input, biometric sensor input, voice input, image recognition, accelerometer input, position sensor input, and wherein the user specifies the modes and sequential order using a user interface.

7. The method of claim 6, wherein the user interfaces enable a user to first establish a particular voice recognition pattern followed by a particular image, with subsequent logons to a computer associated with the user interfaces being permitted only when the voice recognition pattern is spoken into the computer followed by presentation of the image to the computer.

8. The method of claim 6, comprising allowing a user to select the behavior to be enabled by the input values.

9. The method of claim 6, wherein the behavior is unlocking the computer for full use thereof.

10. The method of claim 6, wherein the behavior is establishing a network connection.

11. Computing device for authenticating a user comprising:

a processor;

a display coupled to the processor;

a first input device coupled to the processor;

a second input device coupled to the processor, the second input device being a different genre of input device than the first input device;

the processor receiving a first input mode value from the first input device;

the processor receiving a second input mode value from the second input device;

the processor determining whether the first and second values match user-defined values and are input in a user-defined order, and only if a match is found and the first and second values are input in the user-defined order, executing a computer behavior, wherein the user-defined order and user-defined values are entered using a user interface, and wherein the first input device is selected from the group of devices consisting of keypads, touch screens, biometric sensors, microphones, cameras, accelerometers, position sensors and the second input device is selected from the group of devices consisting of keypads, touch screens, biometric sensors, microphones, cameras, accelerometers, position sensors.

12. The device of claim 11, wherein the processor allows a user to select the computer behavior.

13. The device of claim 11, wherein the computer behavior is unlocking the computer for full use thereof.

14. The device of claim 11, wherein the computer behavior is establishing a network connection.

* * * * *